Figure 1:
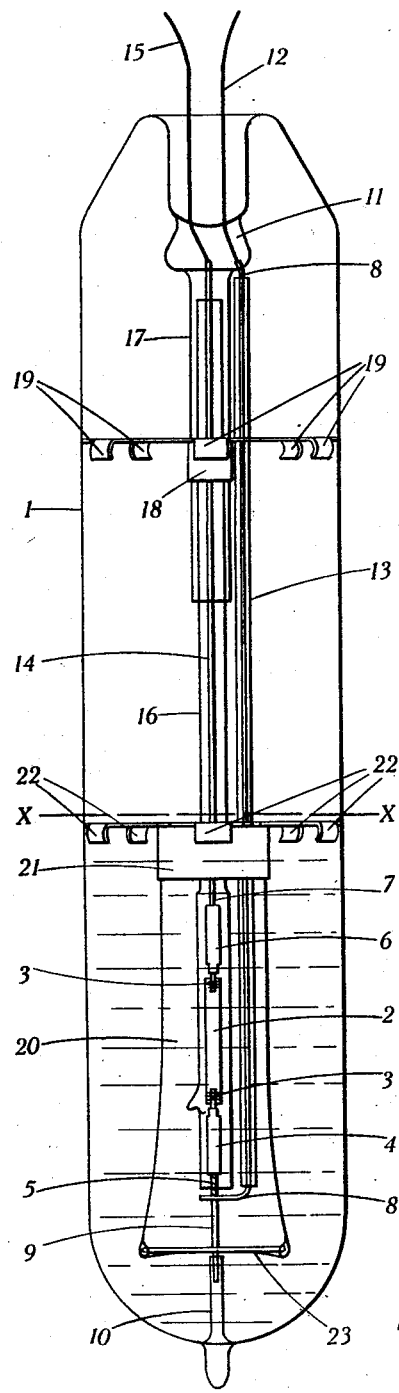

April 23, 1940.  P. FREEDMAN  2,197,760
ELECTRICAL DISCHARGE LAMP
Filed Nov. 29, 1937   2 Sheets-Sheet 2

Paul Freedman
INVENTOR
BY
Darby & Darby
ATTORNEY

Patented Apr. 23, 1940

2,197,760

UNITED STATES PATENT OFFICE 2,197,760

ELECTRICAL DISCHARGE LAMP

Paul Freedman, London, England, assignor to Crompton Parkinson Limited, Guiseley, near Leeds, England Application November 29, 1937, Serial No. 176,961
In Great Britain December 1, 1936

13 Claims. (Cl. 176—122)

The present invention relates to improvements in and relating to artificially cooled discharge lamps and, in particular, to artificially cooled discharge lamps of the super high pressure mercury vapour type.

Hitherto it has been a common practice artificially to cool such discharge lamps by means of a stream of water in contact with the envelope exterior. Such practice, however, had a number of disadvantages, the chief being that it involved the provision of a water supply and a waste pipe for each lighting unit.

According to the invention artificial cooling of a discharge lamp is effected by the agency of boiling of a liquid and recondensation of the vapour thus evolved, the discharge lamp and the liquid being both enclosed in a hermetically sealed container, composed wholly or partly of vitreous material, such as glass.

According to a further feature of the present invention there is provided a method of cooling a discharge lamp in which the discharge envelope is submerged in a liquid and cooling is effected during operation of the lamp by said liquid passing through a closed evaporation and condensation cycle.

The aforesaid container may be of any desired shape, for example in the form of an envelope of an incandescent electric lamp, and any suitable provision may be made for facilitating the dissipation of heat from the container walls and inducing rapid condensation and recondensation of the vapour generated within said container. Thus, for example, in cases wherein the container includes a part consisting of metal, which part would generally be located at the upper portion of the container, outer and/or inner radiating fins, corrugations or the like may be associated with such part. In cases wherein the whole of the container is of glass or like vitreous material or wherein the upper part is of such material said upper part is advantageously embraced by one or more metallic collars provided with radiating fins, corrugations or the like. In order to facilitate transfer of heat from the container wall to said collar or collars, the part or parts of the envelope embraced thereby is or are preferably coated with a relatively thick layer of a metallic paint of high thermal conductivity. The collar or collars and its, or their, radiating fins, corrugations or the like may advantageously be of copper or aluminium and in order to facilitate heat dissipation by radiation the external surfaces of said collar or collars and fins, corrugations or the like are preferably provided with a mat black surface, for example by means of a suitable paint.

The lower portion of the aforesaid container is filled with a liquid which is hereinafter referred to as the "container liquid" and this may consist of a single chemical compound, of two or more miscible liquid chemical compounds, or of one or more liquid chemical compounds having dissolved therein one or more solid chemical compounds.

When the container liquid consists of a single chemical compound it is preferably of low molecular weight and its boiling point is preferably not less than 60° C. and not more than 300° C. under normal atmospheric pressure; thus, for example, water ethylene glycol, diethylene glycol, triethylene glycol, tetralin or carbitol, may be employed.

When the container liquid consists of two or more miscible liquid chemical compounds, the boiling point of the mixture should preferably be not less than 60° C., and the chemical compound whose vapour constitutes the whole or the greater part of the atmosphere in the region of the sealed container above the container liquid should preferably be of low molecular weight and have a boiling point not lower than 60° C. and not higher than 300° C. The miscible liquid chemical compounds may constitute a mixture of the maximum boiling point type, that is a mixture of the kind in which the boiling point of the whole is higher than the boiling point of the constituent chemicals; thus, for example, the container liquid may consist of a mixture of water and formic acid. Preferably, however, the miscible liquid chemical compunds are so chosen as to constitute a mixture of the minimum boiling point type, that is a mixture of the kind in which the boiling point of the whole is lower than the boiling point of the constituent chemicals, and the quantity of the minimum boiling point liquid, whose vapour constitutes the whole or the greater part of the atmosphere in the region of the sealed container above the container liquid, constitutes only a small proportion of the total quantity of the container liquid, so that under normal operating conditions of the device, the whole of this more volatile constituent is in a vapour state except for the transient liquid state of the condensed droplets prior to their re-ecaporation. Such minimum boiling point mixture may, for example, consist of pyridine and water.

When the container liquid consists of a liquid chemical compound having dissolved therein a solid chemical compound, the solution should preferably have a boiling point higher than the boiling point of the liquid chemical compound constituent and the liquid chemical compound should preferably be of low molecular weight and have a boiling point not lower than 60° C. and not higher than 300° C. A container liquid of this type may, for example, consist of water and calcium chloride, the proportion of calcium chloride being such that the solution is in a liquid state at a temperature less than the lowest temperature of the surroundings to which the sealed container may be subjected.

The space in the sealed container above the container liquid is exhausted and contains either only vapour evolved from the container liquid or such vapour and a small quantity of gas soluble in such liquid.

The discharge lamp itself is situated in the lower portion of the sealed container and is completely immersed in the container liquid and any suitable leads are provided for conveying the discharge current thereto. Said leads may pass through a single pinch or through separate seals associated with the container and where necessary or desirable one or both of the leads may be covered with any suitable insulating material over the entire length from the point of entry into the seal or pinch of the container to the point of enry into the discharge lamp. Any insulating material may be employed which is non-porous and not affected by the temperature conditions or by the container liquid or the vapours evolved thereby. Thus, for instance, vitreous or ceramic material, or rubber, preferably electro-deposited on the leads may be employed or the lead or leads may be coated with aluminium or a suitable aluminium alloy and then subjected to an anodising treatment.

During operation of the device the temperature of the container liquid rises to a value dependent upon the nature of the liquid, the characteristics of the container and the energy input, and the vapour evolved by the boiling container liquid condenses on the walls of the sealed container in the region above the container liquid, delivering up the latent heat of evaporation in the process of condensation, the liquid drops return to the container liquid, again evaporate carrying away an amount of heat corresponding to the latent heat of evaporation, are recondensed giving up the latent heat of evaporation, and so on throughout the operation of the device, the condenser liquid and the exterior of the discharge lamp being kept in this manner at a constant temperature.

While effective cooling of a discharge lamp according to the invention may be achieved when employing a single chemical compound as the container liquid, the use of a container liquid composed of two or more miscible liquid chemical compounds, or composed of a liquid chemical compound having dissolved therein a solid chemical compound, is advantageous in that it makes it possible to confine the agitation of the container liquid due to ebullition to the surface layer so that the light of the discharge lamp in a large measure passes through a substantially tranquil liquid.

I have found that in most cases it is very advantageous for a number of reasons, and in particular for the purpose of increasing the efficiency of heat transfer, to render the container liquid free from gas prior to sealing the container. I have also found that in certain cases, as for example when glycol is employed as the container liquid, that it is very advantageous to remove all traces of water from the container liquid and from the inner walls of the container.

I have further found, however, that in some cases it is advantageous to introduce into the sealed container in the space above the container liquid, a small quantity of gas soluble in the container liquid; thus, for example, if water is employed as the container liquid, a small quantity of carbon dioxide, sulphur dioxide, or ammonia may be introduced into the container.

If desired, any suitable means may be provided for inducing the generation of convection currents in the container liquid. Thus, for example, a tube, preferably provided with a flared lower end, may be located within the container so that it embraces the discharge lamp, the upper end of said tube preferably terminating a little below the upper level of the container liquid.

Any suitable spacing arms, springs or the like may be provided for supporting the discharge lamp in the desired position within the container. Thus, for example, the ends of the discharge lamp may be carried by wires fused to the ends of the container, some of which may be the lead-in wires and any suitable arms may radiate from intermediate parts of the lamp assembly to the inner wall of the container.

Figure 2:
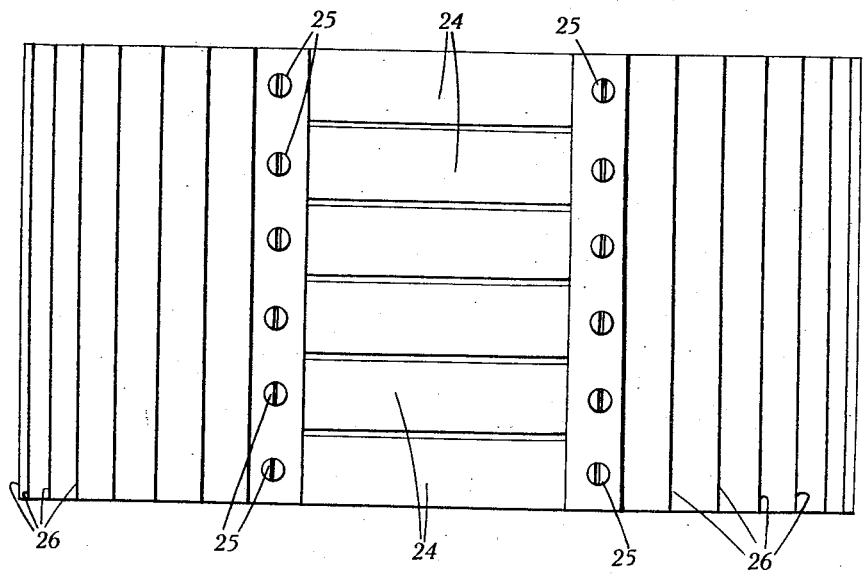
Figure 3:
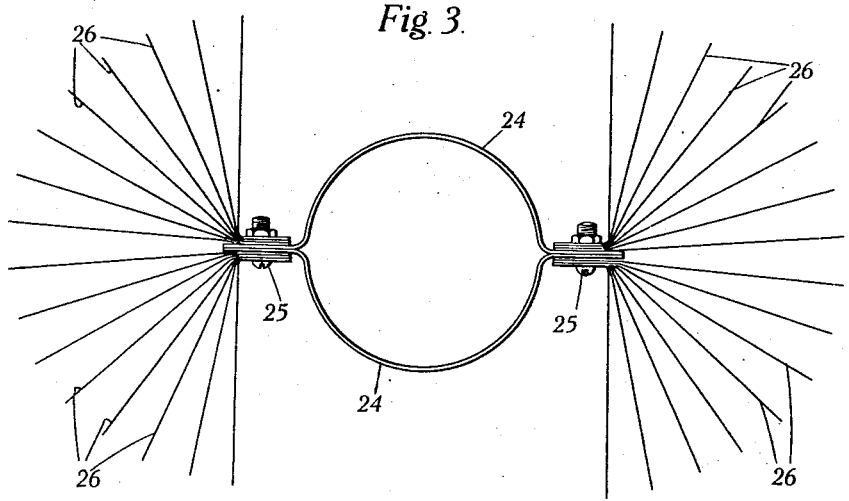

In order that the invention may be well understood one embodiment thereof will now be described by way of example and with reference to the accompanying drawings, in which Figure 1 shows the device in front elevation, Figure 2 shows one form of cooling means which may be associated with the device shown in Figure 1, and Figure 3 is a plan view of the cooling means shown in Figure 2.

Referring to Figure 1 of the drawings, the container 1 is made entirely of glass and a super high pressure mercury vapour lamp 2 is housed in its lower portion. The lamp 2 includes two electrodes 3, 3 the lower one of which is connected through the seal 4 to the leading-in wire 5 and the other one is connected through the seal 6 to the leading-in wire 7.

The wire 5 is connected to a lead 8 and to a supporting wire 9 extending from a glass tube 10, the latter being fused to the lowermost point of the container and serving to locate the lamp 2 whilst the wire 8 passes into the pinch 11 at the top of the container where it is united to the external lead 12. If desired, the lead 8 may be encased within an insulating tube or sleeve 13 of glass or other suitable material.

The wire 7 is connected to the complementary lead 14 which also passes into the pinch 11 of the container and is in electrical connection with the second external lead 15. The lead 14 is enclosed within a silica tube 16, the lower end of which is fused to the envelope of the lamp 2 and the upper end of which fits closely into a glass tube 17 fused to the pinch 11 of the container.

It will be appreciated that the lower end of the lamp assembly is supported within the container by means of the wire 9 and tube 10, whilst the upper part is supported by the tube 17. The assembly is further supported concentrically with respect to the container 1 by means of a locating spring comprising a collar 18 fitting tightly around the tube 17 and five radial arms 19, of which all five appear in the front elevation of the device, the ends of said arms being downturned so as to make resilient contact with the interior of the container 1.

The container is charged up to the line marked X—X with the desired container liquid and a tube 20 embraces the lamp assembly from a point just below the level X—X to a point below the lowermost part of said assembly, said tube having a flared or funnel-shaped lower portion and serving to promote convection currents in the liquid.

The aforesaid tube is located concentrically in the container and is supported at its upper end by means of a spring member similar to the member 18, 19 and comprising a hub 21 closely gripping the tube and radiating arms 22 having downturned ends contacting with the walls of the container. The lower part of the tube 20 is centralised and supported by means of a cross piece 23 fused to the flared end of the tube and welded to the supporting wire 9.

The internal part of the container above the level X—X serves as a condensation chamber and it is, of course, desirable to induce the ready dissipation of heat from the wall of this part. For this purpose the outer surface of the container wall may advantageously be coated with a metallic paint of high thermal conductivity and heat radiating fins may extend therefrom.

Figures 2 and 3 of the drawings show one convenient form of heat radiating attachment, such attachment comprising a series of collars 24 each consisting of two strips of copper or other suitable material of semi-circular form with outturned lugs through which are passed bolts 25, said bolts also passing through the inner edges of groups of thin fins 26 which fins may also be of copper. The bolts 25 thus hold the parts together as a single assembly but as a result of employing a number of collars as opposed to a single sleeve there is an increased degree of flexibility which ensures tight contact with the container when the bolts 25 are tightened.

The surfaces of the aforesaid fins 26 and of the collars 24 other than the surfaces presented towards the container 1 are preferably coated with a black material having a mat surface so that their heat radiating properties are enhanced as much as possible.

Whilst one embodiment of the present invention has been hereinbefore described it is to be understood that the specific details may be varied or modified without departing from the scope thereof. Thus, for example, the container liquid may consist of two or more miscible liquid chemical compounds and one or more solid chemical compounds dissolved in the liquid. Again, according to another modification of the invention, the container liquid may comprise two or more liquid chemical compounds, which are not miscible but form a homogenised emulsion, which acts as a diffusing medium for the light emanating from the discharge lamp. According to yet another modification of the invention the colour and/or refractive index of the container liquid may be chosen so as to affect the lighting effect in a desired manner.

Moreover, the shape and dimensions of the device as well as the power of the device may be varied to suit any particular requirements, and the discharge lamp itself may be of any suitable kind and advantageously of the kind forming the subject of co-pending application Serial No. 176,962 filed November 29, 1937.

I claim:

1. A discharge lamp and cooling means associated therewith comprising in combination a hermetically sealed container, a discharge tube located in said container, cooling liquid in said container, in which liquid said tube is wholly submerged when the lamp is in the operative position and an open ended tube, flared at its lower end and located in the said container so as to surround the discharge tube and terminate on a level just below the level of said liquid.

2. A discharge lamp and cooling means associated therewith comprising in combination a hermetically sealed container, a discharge tube located in said container, cooling liquid in said container, in which liquid said tube is wholly submerged when the lamp is in the operative position, at least one resilient element surrounding said discharge tube and supporting said tube, radial arms on said element contacting the walls of said container.

3. A high temperature and pressure discharge lamp and cooling means associated therewith comprising a hermetically sealed container, a discharge tube located entirely within said container and a cooling liquid partially filling said container and completely submerging said discharge tube when the lamp is in its operative position, whereby in operation said liquid goes through a closed evaporation and condensation cycle wholly within the limits of said container to effect cooling of said lamp.

4. A high pressure discharge lamp and cooling means associated therewith comprising a hermetically sealed container, a discharge tube located in said container and a cooling liquid partially filling said container and submerging said tube when the lamp is in its operative position whereby in operation said liquid goes through a closed evaporation and condensation cycle wholly within the limits of said container whereby to effect cooling of said lamp, the part of said container which is uppermost when said lamp is in its operative position being of metal and having heat radiating fins.

5. A discharge lamp and cooling means associated therewith according to claim 3 in which the liquid is homogeneous.

6. A discharge lamp and cooling means associated therewith according to claim 3 in which the liquid is homogeneous and comprises at least two miscible liquids.

7. A discharge lamp and cooling means associated therewith according to claim 3, in which the cooling liquid is homogeneous and has at least one solid dissolved therein.

8. A discharge lamp and cooling means associated therewith according to claim 3 in which the liquid is homogeneous and comprises at least one of the group—water, ethylene glycol, diethylene glycol, triethylene glycol, tetraline, carbitol.

9. A discharge lamp and cooling means associated therewith according to claim 3 in which said cooling liquid is homogeneous and comprises water and calcium chloride dissolved therein.

10. A discharge lamp and cooling means associated therewith comprising in combination a hermetically sealed container, a discharge tube located in said container, cooling liquid partially filling said container and submerging said tube when the lamp is in its operative position, the space in said container above said liquid being air-free.

11. A discharge lamp and cooling means associated therewith according to claim 10, in which said liquid is air free.

12. A discharge lamp and cooling means associated therewith comprising in combination a hermetically sealed container, a discharge tube located in said container, cooling liquid partially filling said container and submerging said tube when said lamp is in its operative position and means promoting convection currents in said liquid.

13. A high pressure discharge lamp and cooling means associated therewith comprising a hermetically sealed container, a high pressure discharge tube located in said container, a cooling liquid partially filling said container and wholly submerging said tube when the lamp is in its operative position whereby in operation said liquid goes through a closed evaporation and condensation cycle wholly within the limits of said container whereby to effect cooling of said lamp, at least one relatively thick coating of high thermal conductivity around said container, and heat radiating fins extending from said coated part, said fins having black matt surfaces on all parts other than those contacting with said coating.

PAUL FREEDMAN.